United States Patent
Houshuyama et al.

(10) Patent No.: US 9,945,945 B2
(45) Date of Patent: Apr. 17, 2018

(54) SIGNAL PROCESSING APPARATUS, OBJECT DETECTING APPARATUS, APPARATUS PROVIDED WITH OBJECT DETECTING FUNCTION, AND OBJECT DETECTING METHOD

(71) Applicant: NEC CORPORATION, Tokyo (JP)

(72) Inventors: Osamu Houshuyama, Tokyo (JP); Ryohei Saito, Tokyo (JP); Hiroyuki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/380,757

(22) PCT Filed: Feb. 25, 2013

(86) PCT No.: PCT/JP2013/001072
§ 371 (c)(1),
(2) Date: Aug. 25, 2014

(87) PCT Pub. No.: WO2013/128878
PCT Pub. Date: Sep. 6, 2013

(65) Prior Publication Data
US 2015/0016224 A1 Jan. 15, 2015

(30) Foreign Application Priority Data
Feb. 28, 2012 (JP) ................. 2012-041455

(51) Int. Cl.
*G01S 15/04* (2006.01)
*G01S 7/536* (2006.01)
(Continued)

(52) U.S. Cl.
CPC ............... *G01S 15/04* (2013.01); *G01S 7/52* (2013.01); *G01S 7/536* (2013.01); *G01S 15/32* (2013.01); *G01S 15/88* (2013.01)

(58) Field of Classification Search
CPC ........ G01S 15/104; G01S 15/02; G01S 15/04; G01S 15/06; G01S 15/32; G01S 7/527; G01S 7/536
See application file for complete search history.

(56) References Cited

U.S. PATENT DOCUMENTS

| 4,271,412 A | 6/1981 | Glass et al. |
| 2006/0022680 A1* | 2/2006 | Suginouchi ......... G01F 23/2962 324/635 |

(Continued)

FOREIGN PATENT DOCUMENTS

| JP | 63-61974 A | 3/1988 |
| JP | 2005-9979 A | 1/2005 |

(Continued)

OTHER PUBLICATIONS

Tomoharu Sato et al., "Multi Channelization on Pulse Compression Using Chirp Signal Modulated by Maximum Length Sequences in Ultrasonic Distance Measurement", Report of Autumn Meeting, Acoustical Society of Japan, Sep. 2008, pp. 1527-1528 [internet] <http://www.kurosawa.ip.titech.ac.jp/publications/domestic_conf/jasj08ts-2.pdf>. See cited NPL1 on p. 1, [0003] of the Applicant's Specification for explanation of relevance.

(Continued)

*Primary Examiner* — Hongmin Fan

(57) ABSTRACT

Provided is a technology which is able to detect an object with high accuracy. A signal processing apparatus 1 includes a generating unit 2 and a detecting unit 3. The generating unit 2 includes a function of generating, as a transmitting signal, a modulation wave whose frequency changes non-repetitively. The detecting unit 3 includes a function of fetching the transmitting signal and a receiving signal which is received by a receiving means that can receive a reflection signal generated when the transmitting signal is reflected by an object. The detecting unit 3 includes a function of (Continued)

detecting at least one of presence of the object, distance to the object, and moving speed of the object, based on correlation between the receiving signal and the transmitting signal.

7 Claims, 10 Drawing Sheets

(51) Int. Cl.
   *G01S 15/32* (2006.01)
   *G01S 15/88* (2006.01)
   *G01S 7/52* (2006.01)

(56) References Cited

U.S. PATENT DOCUMENTS

| | | | |
|---|---|---|---|
| 2010/0204575 A1* | 8/2010 | Roche | G01S 7/64 600/437 |
| 2011/0187600 A1* | 8/2011 | Landt | G01S 3/02 342/458 |
| 2011/0205102 A1* | 8/2011 | Shibata | G01S 13/345 342/70 |
| 2011/0285593 A1* | 11/2011 | Cavirani | G01S 7/024 342/457 |
| 2011/0309968 A1* | 12/2011 | Reiher | G01S 7/354 342/70 |

FOREIGN PATENT DOCUMENTS

| | | |
|---|---|---|
| JP | 2005-337848 A | 12/2005 |
| JP | 2008-256452 A | 10/2008 |
| JP | 2009-222445 A | 10/2009 |
| JP | 2010-122830 A | 6/2010 |
| WO | 2005/106530 A1 | 11/2005 |
| WO | 2009/110096 A1 | 9/2009 |

OTHER PUBLICATIONS

Yasunari Yokota, "Lecture Document, Signal Processing, Section 3, Non-stationary Signal Processing/Cepstrum Analysis" [internet] <http://www1.gifu-u.ac.jp/~yktlab/sp3.pdf>, May 22, 2003. See cited on p. 18, [0043] of the Applicant's Specification for explanation of relevance.

International Search Report for PCT Application No. PCT/JP2013/001072, dated May 21, 2013.

Japanese Office Action for JP Application No. 2014-502023 dated Apr. 25, 2017 with English Translation.

* cited by examiner

SIGNAL PROCESSING APPARATUS, OBJECT DETECTING APPARATUS, APPARATUS PROVIDED WITH OBJECT DETECTING FUNCTION, AND OBJECT DETECTING METHOD

This application is a National Stage Entry of PCT/JP2013/001072 filed on Feb. 25, 2013, which claims priority from Japanese Patent Application 2012-041455 filed on Feb. 28, 2012, the contents of all of which are incorporated herein by reference, in their entirety.

TECHNICAL FIELD

The present invention relates to a technology to detect an object.

BACKGROUND ART

Non Patent Literature 1 proposes a technology measuring distance to an object. In the technology disclosed in Non Patent Literature 1, an apparatus for measuring the distance to the object (distance measuring apparatus) transmits a sound wave, receives the sound wave which is reflected by the object, and measures the distance by using a cross correlation function between a waveform of the received sound wave and a waveform of the transmitting sound wave.

CITATION LIST

Non Patent Literature

[NPL1] SATO Tomoharu, HIRATA Shinnosuke, KUROSAWA Minoru, and KATAGIRI Takashi "Multi channelization on pulse compression using chirp signal modulated by maximum length sequences in ultrasonic distance measurement" Report of Autumn Meeting, Acoustical Society of Japan, September, 2008, p. 1527-1528

SUMMARY OF INVENTION

Technical Problem

In the technology proposed by Non Patent Literature 1, the waveform of the sound wave transmitted from the distance measurement apparatus includes a similar waveform in a cyclic manner. In the cross correlation function, therefore, in addition to a main peak, a peak which is called a side lobe or a grating lobe (hereinafter, such peak is described as a sub-peak) occurs due to correlation between sections each having the similar waveform. In the technology of Non Patent Literature 1, the distance measurement apparatus uses the main peak of the cross correlation function. In an environment including ambient noise, the height of the sub-peak may be comparable to that of the main peak. In this case, the distance measurement apparatus using the main peak may output inaccurate results due to the sub-peak. That is, the distance measurement apparatus using the technology of Non Patent Literature 1 has the problem that detection accuracy decreases due to the sub-peak in correlation.

The present invention is proposed to solve the problem. A main object of the present invention is to provide a technology which detects an object with high accuracy.

Solution to Problem

To achieve the object, a signal processing apparatus of the present invention, includes:

a generating unit which generates, as a transmitting signal, a modulation wave whose frequency changes non-repetitively; and a detecting unit which detects at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

An object detecting apparatus of the present invention, includes:

a signal processing apparatus of the present invention;

a transmitting unit which transmits a transmitting signal generated by a generating unit of the signal processing apparatus; and receiving unit which receives a reflection signal generated when the transmitting signal is reflected by an object.

An apparatus provided with an object detecting function in the present invention, includes:

an object detecting apparatus of the present invention; and a control apparatus which controls operation of its own apparatus by using an object detecting result of the object detecting apparatus.

An object detecting method of the present invention, includes, generating, as a transmitting signal, a modulation wave whose frequency changes non-repetitively;

detecting at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

Advantageous Effects of Invention

The present invention is able to detect an object with high accuracy.

DESCRIPTION OF EMBODIMENTS

Figure 1:
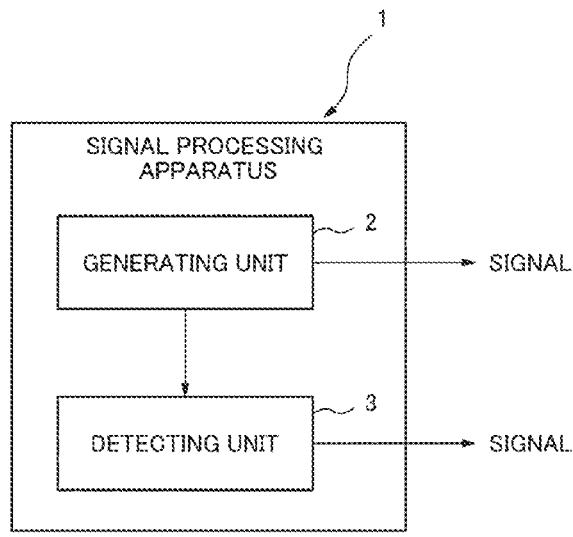
FIG. 1 shows a block diagram illustrating a configuration of a signal processing apparatus of a first exemplary embodiment of the present invention.

Exemplary embodiments according to the present invention are explained below by referring to the drawings.

First Exemplary Embodiment

FIG. 1 is a block diagram briefly illustrating a configuration of a signal processing apparatus of a first exemplary embodiment of the present invention. The signal processing apparatus 1 of the first exemplary embodiment is configured by a computer apparatus including a CPU (central processing unit), etc. The signal processing apparatus 1 includes a generating unit (generating means) 2 and a detecting unit (detecting means) 3.

The generating unit 2 includes a function of generating, as a transmitting signal, a modulation wave whose frequency changes non-repetitively. The detecting unit 3 includes a function of fetching the transmitting signal and a receiving signal which is received by a receiving means that can receive a reflection signal generated when the transmitting signal is reflected by an object. The detecting unit 3 includes a function of detecting at least one of presence of the object, distance to the object, and moving speed of the object, based on correlation between the receiving signal and the transmitting signal.

The signal processing apparatus 1 of the first exemplary embodiment generates, as the transmitting signal, the modulation wave whose frequency changes non-repetitively. Unnecessary data (e.g. sub-peak) in signal processing using the correlation between the transmitting signal and the receiving signal is therefore suppressed. Thereby the signal processing apparatus 1 can suppress the problem in which detection accuracy decreases due to the unnecessary data (sub-peak). In other words, the signal processing apparatus 1 of the first exemplary embodiment can accurately detect an object.

Figure 2:
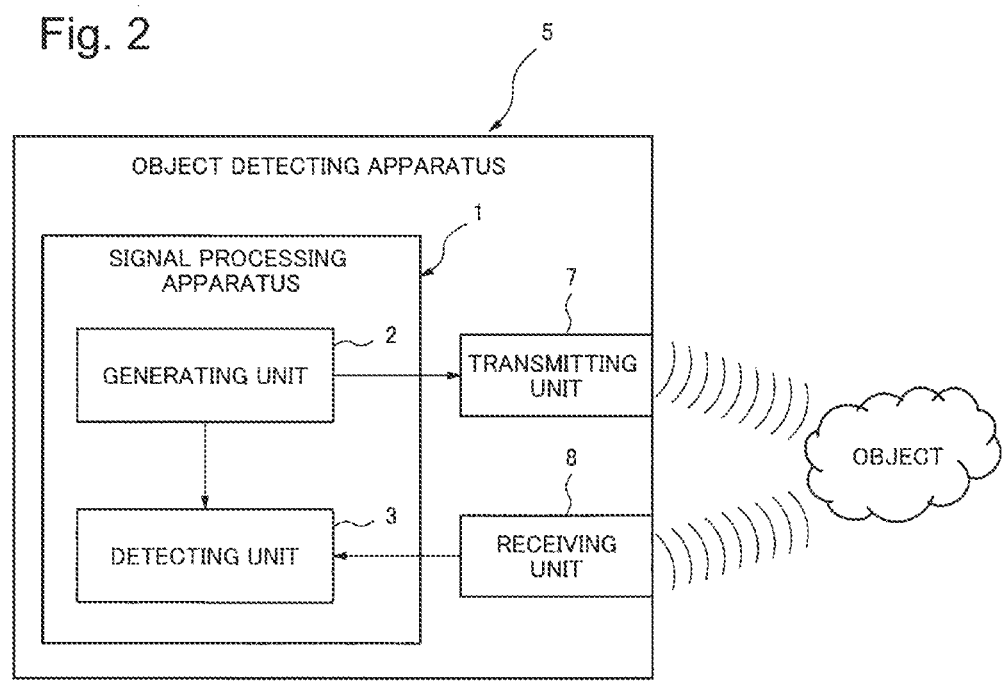
FIG. 2 shows a block diagram illustrating a configuration of an object detecting apparatus of the first exemplary embodiment of the present invention.

FIG. 2 is a block diagram briefly illustrating a configuration of an exemplary embodiment of an object detecting apparatus of the present invention including the signal processing apparatus 1. The object detecting apparatus 5 includes a transmitting unit (transmitting means) 7 and a receiving unit (receiving means) 8 in addition to the signal processing apparatus 1. The transmitting unit 7 includes a function of transmitting the transmitting signal generated by the generating unit 2 of the signal processing apparatus 1. The receiving unit 8 includes a function of receiving a reflection signal generated when the transmitting signal is reflected by an object. The object detecting apparatus 5 includes the signal processing apparatus 1 and therefore can acquire an advantageous effect (i.e. advantageous effect in which the object is accurately detected).

Figure 3:
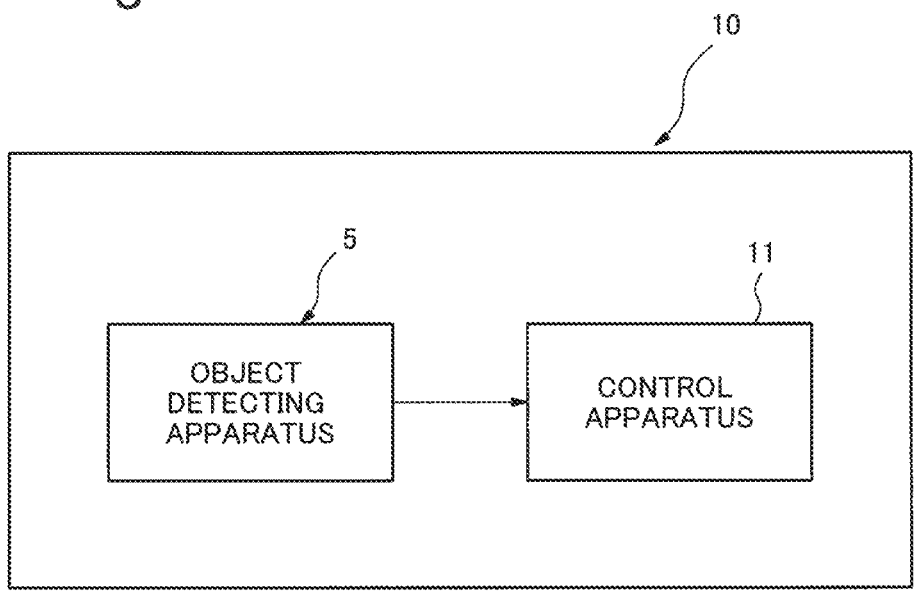
FIG. 3 shows a block diagram illustrating a configuration of an exemplary embodiment of an apparatus with an object detecting function of the present invention.

FIG. 3 is a block diagram briefly illustrating a configuration of an exemplary embodiment of an apparatus with an object detecting function of the present invention. An apparatus 10 with an object detecting function includes the object detecting apparatus 5 and a control apparatus 11 which controls operations of the apparatus 10 using object detection results of the object detecting apparatus 5. The apparatus 10 with the object detecting function includes the object detecting apparatus 5 equipped with the signal processing apparatus 1 of the first exemplary embodiment and therefore can accurately operate based on the object detection results which are accurately detected by the object detecting apparatus 5.

Second Exemplary Embodiment

A second exemplary embodiment of the present invention is explained below.

Figure 4:
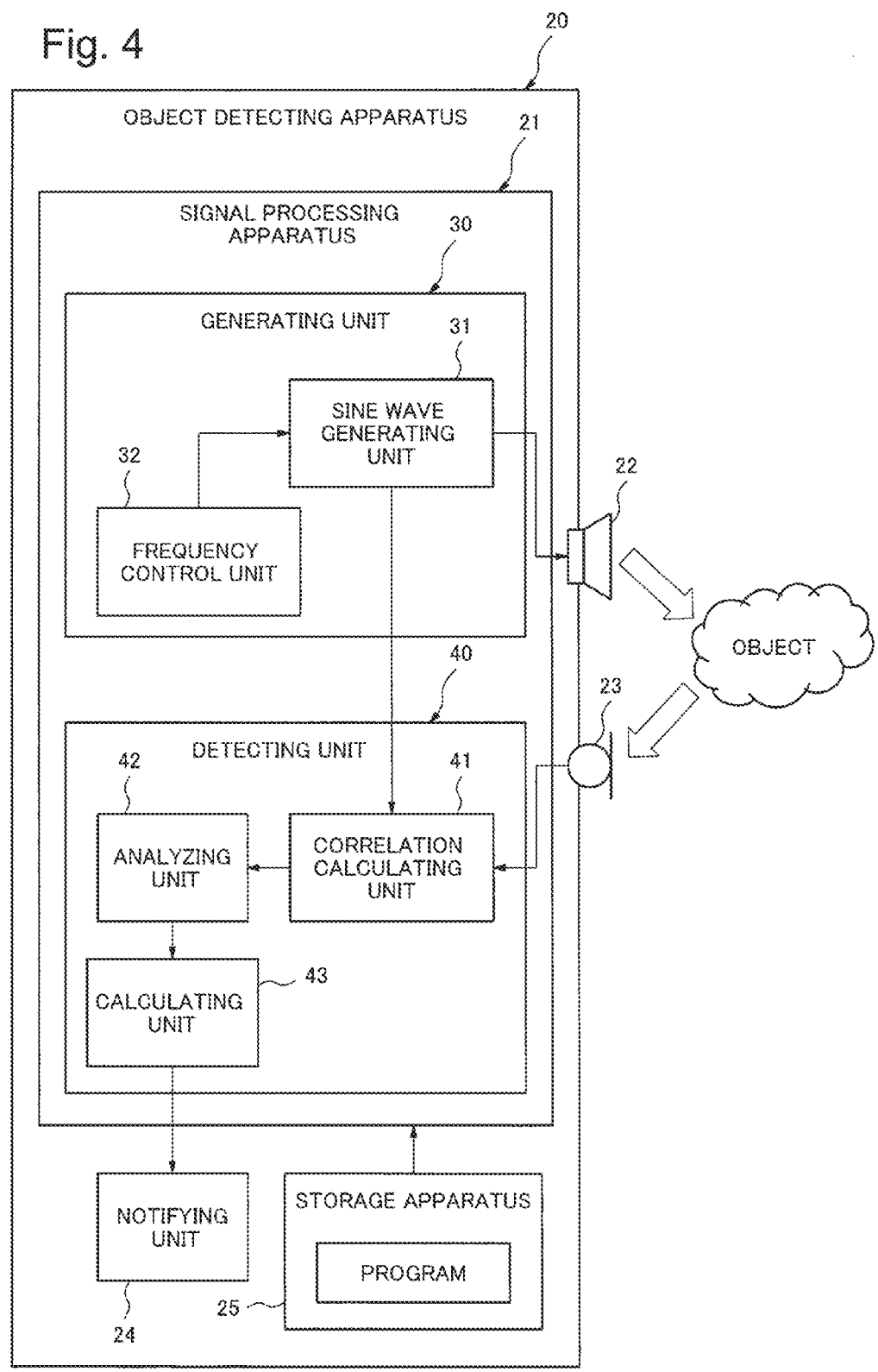
FIG. 4 shows a block diagram illustrating a configuration of an object detecting apparatus of a second exemplary embodiment of the present invention.

FIG. 4 is a block diagram briefly illustrating a configuration of an object detecting apparatus of the second exemplary embodiment. An object detecting apparatus 20 of the second exemplary embodiment includes a signal processing apparatus 21, a transmitting unit (transmitting means) 22, a receiving unit (receiving unit) 23, a notifying unit (notifying means) 24, and a storage apparatus 25.

The transmitting unit 22 is a transmitter, which includes a transformation element (e.g. transducer). The transformation element has a function of generating an elastic vibrational wave propagating in an elastic body which may be gas, liquid or solid. The elastic vibrational wave may be any one of a sound wave (elastic vibrational wave vibrating at an audible frequency), an ultrasonic wave (elastic vibrational wave vibrating at a high frequency which is inaudible), and a super low frequency sound wave (elastic vibrational wave vibrating at a low frequency which is inaudible). The transmitting unit 22 includes a function of, when the transformation element is driven based on a transmitting signal (electric signal) generated by the signal processing apparatus 21, transforming the transmitting signal into the elastic vibrational wave, and transmitting (outputting) the elastic vibrational wave as the transmitting signal.

The receiving unit 23 is a receiver, which includes an antenna function of receiving a reflection signal generated when the transmitting signal transmitted from the transmitting unit 22 is reflected by an object.

The storage apparatus 25 includes a function of storing computer programs (may be briefly described as programs) and various data. The storage apparatus 25 stores programs causing the signal processing apparatus 21 to generate the transmitting signal.

The signal processing apparatus 21 is a computer apparatus with a CPU, and performs signal processing based on the computer program stored in the storage apparatus 25. In the second exemplary embodiment, the signal processing apparatus 21 includes a generating unit (generating means) 30 and a detecting unit (detecting means) 40, as a functional unit based on the computer program.

The generating unit 30 includes a function of generating, as the transmitting signal, a modulation wave whose frequency changes non-repetitively. The generating unit 30 includes for example a sine wave generating unit (sine wave generating means) 31 and a frequency control unit (frequency control means) 32. The sine wave generating unit 31 includes a function of generating a sine wave. The frequency control unit 32 includes a function of controlling the sine wave generating unit 31 so that the frequency of the sine wave generated by the sine wave generating unit 31 changes non-repetitively. As a specific example, the frequency control unit 32 controls the frequency of the sine wave generated by the sine wave generating unit 31 so that a waveform representing frequency change becomes a non-repetitive form.

The detecting unit 40 includes a function of detecting an object based on correlation between the transmitting signal transmitted from the transmitting unit 22 and a receiving signal received by the receiving unit 23. The function of detecting an object includes at least one of a function of detecting presence (presence or absence) of the object, a function of detecting (measuring) distance to an object, and a function of detecting (measuring) moving speed of an object.

In the second exemplary embodiment, the detecting unit 40 includes a correlation calculating unit 41, an analyzing unit 42, and a calculating unit 43. The correlation calculating unit 41 includes a function of fetching a transmitting signal generated by the sine wave generating unit 31, as the transmitting signal transmitted from the transmitting unit 22 and calculating a cross correlation function between the fetched transmitting signal and the receiving signal received by the receiving unit 23. Specifically, the correlation calculating unit 41 performs quantitative evaluation of a degree of coincidence between an expected reception waveform and a waveform of the receiving signal and calculates the cross correlation function. The expected reception waveform is a waveform of an expected receiving signal which is estimated based on a waveform of the transmitting signal. In a case that an object reflecting the transmitting signal stands still and signal distortion at the transmitting unit 22 and the receiving unit 23 is sufficiently small, the expected reception waveform is regarded as the same as the waveform of the transmitting signal generated by the sine wave generating unit 31.

The analyzing unit 42 includes a function of calculating a reflection position at which the transmitting signal is reflected (occurrence position of a reflection wave) based on the cross correlation function calculated by the correlation calculating unit 41. For example, the analyzing unit 42 calculates propagation delay based on time difference in which an absolute value of the cross correlation function is maximized and can calculate the reflection position based on the calculation result and the sound speed.

The calculating unit 43 includes a function of detecting an object by using the reflection position calculated by the analyzing unit 42. Specifically, having the function of detecting presence (presence or absence) of an object, the calculating unit 43 compares the calculated reflection position with a predetermined position (infinity or a position far away from a position where it is supposed an object is located, e.g. a position of a wall). Determining the calculated reflection position lies at a closer position compared with the predetermined position, the calculating unit 43 determines the object exists. If the analyzing unit 42 includes a function of counting number of peaks in the cross correlation function, the calculating unit 43 can detect (measure) the number of the existing objects based on the number of peaks.

Including a function of detecting (measuring) the distance to an object, the calculating unit 43 measures the distance to the detected object based on the calculated reflection position.

Further including a function of detecting (measuring) the moving speed of an object, the calculating unit 43 detects the moving speed of the object as follows. In this case, a plurality of moving speeds of the object are assumed, the expected reception waveform is calculated in consideration of the Doppler Effect for each assumed speed, and information on the expected reception waveform is given to the object detecting apparatus 20. The correlation calculating unit 41 calculates a cross correlation function between the expected reception waveform and the reception waveform for each speed. The analyzing unit 42 compares the cross correlation functions and finds the expected reception waveform in which the cross correlation function has the largest peak. The calculating unit 43 detects (measures) the speed which is used when the expected reception waveform is calculated, as the moving speed of the object.

The calculating unit 43 includes a function of detecting (measuring) at least one of the presence of an object, the distance to an object, and the moving speed of an object.

The notifying unit 24 includes a function of notifying of the result detected (measured) by the calculating unit 43. The notifying unit 24 is configured by at least one of a display and a speaker.

The object detecting apparatus 20 of the second exemplary embodiment includes the configuration generating, as the transmitting signal, the modulation wave whose frequency changes non-repetitively and therefore can acquire a specific effect. A technology related to signal transmission/reception in object detection is explained, before explanation on the specific effect.

(Explanation of Related Technology)

Performance of receiving a reflection signal which returns when a transmitting signal is reflected by an object differs widely depending on a waveform of the transmitting signal. It also differs depending on characteristics of an element (transducer), installed in a transmitter, generating the transmitting signal and a receiving element (antenna) installed in a receiver. Particularly, a transmitting element utilizing resonance includes the limitation of a range of frequency which can be generated. The transmitting element has the restriction of amplitude of transmittable signal and power. When the restriction is exceeded, the waveform of the transmitting signal may be seriously deformed compared with a desired waveform or the transmitting element may be damaged due to increasing burden. In consideration of increasing a ratio of a receiving signal (reflection signal which is reflected by an object and returns) to ambient noise (noise) (SN (Signal-to-Noise) ratio), it is desirable that the transmitting element transmits a signal at high power. It is difficult to satisfy both of the restriction and the requirement.

In a case that white Gaussian noise is used as the waveform of the transmitting signal, if characteristics of the transmitting element are not considered, a sharp correlation function based on the transmitting signal and the receiving signal (reflection signal) is acquired, and it is easy to detect an object is moving. However, since power of an entire waveform is small compared with the maximum value of amplitude of the waveform in the transmitting signal, SN ratio is deteriorated in an environment including large noise and thereby performance of detecting an object is remarkably reduced.

A waveform which is called tone burst is known as a waveform of the transmitting signal. The waveform is a waveform in which a sine wave is cut by a predetermined time period. The transmitting element can efficiently generate the transmitting signal by matching a frequency of the sine wave with a resonance frequency of the transmitting element. However, since the sine wave partially includes correlation, a sharp peak is not acquired in the correlation function based on the transmitting signal and the receiving signal (reflection signal). It is therefore difficult to accurately detect location of an object by using the correlation function.

As the waveform of the transmitting signal in which characteristics of the transmitting element are considered, SFM (Sinusoidal Frequency Modulation) is known. SFM is a waveform in which a sine wave is frequency-modulated by a sine wave. The resonance frequency of the transmitting element is regarded as a carrier frequency and the sine wave is frequency-modulated by using a sine wave with a frequency lower than the carrier frequency. A range of the frequency modulation is set in order not to largely exceed the resonance frequency of the transmitting element. In the case that SFM is used as the waveform of the transmitting signal, burden on the transmitting element can be reduced and magnitude of the signal can be increased.

An example of a program generating SFM is described below.
=a program generating SFM (program 1)=

```
for ti = 1:1:len;
    sig(ti) = sin(phi);
    tilen = ti/len;
    f1 = fc + beta * sin(2 * pi * ti/(len));
    phi = phi + (2 * pi * f1/fs);
end
====================
```

In the program, "ti" represents a sample number (i.e. time). "len" represents a signal length. "phi" represents a phase. "sig (ti)" represents the waveform of the transmitting signal. "pi" represents the circular constant. "f1" represents a frequency of a modulation sine wave (transmitting signal). "beta" represents a band width. "*" is a multiplication symbol. These apply equally to following programs.

Figure 5:
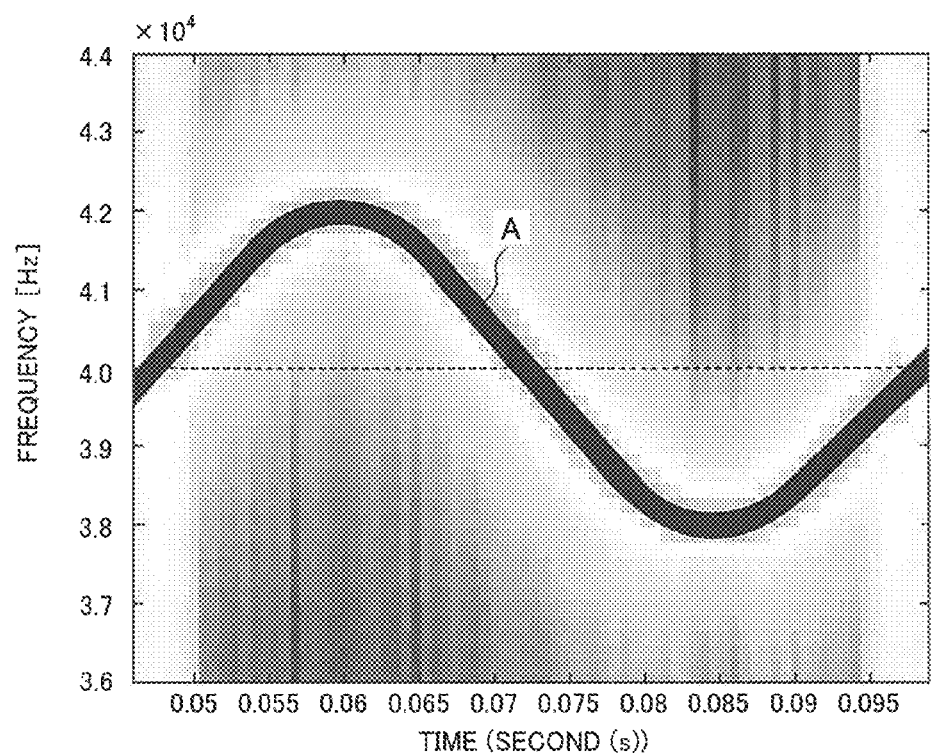
FIG. 5 shows a diagram illustrating an example on how a frequency of SFM (Sinusoidal Frequency Modulation) changes with respect to time based on a spectrogram of SFM.

FIG. 5 is a diagram on the basis of a spectrogram of SFM generated by the program 1. In FIG. 5, a solid line A is added to the spectrogram generated in a simulation in order to make explanations easy to understand. The solid line A shows how the frequency of SFM generated in the program 1 changes with respect to time. As an example, the central frequency is 40 kHz, the bandwidth of modulation is ±2 kHz, and the waveform length is 50 mSec (millisecond). The vertical axis in the graph of FIG. 5 represents a frequency, and the horizontal axis therein represents time. As shown in FIG. 5, it is understood that SFM changes so that a frequency draws a sine wave with respect to time. In explanations of the exemplary embodiment, drawings based on a spectrogram are used in addition to FIG. 5. In the drawings, a solid line is included in the spectrogram in order to make explanations easy to understand, just like FIG. 5.

The correlation function based on the transmitting signal using SFM and the reflection signal thereof (receiving signal) include a sharp peak. Object detection has high accuracy, in which a position of an object is detected based on the transmitting signal using SFM and the reflection signal thereof (receiving signal). Accuracy of object detection (speed detection) is not low, in which speed of an object is detected using the Doppler Effect. A technology using, as a transmitting signal, SFM is used in a radar (refer to U.S. Pat. No. 4,271,412).

Since correlation occurs between sections each having a similar frequency modulation waveform, a sub-peak is generated in the correlation function in addition to a main peak. The sub-peak may have a height comparable to that of the main peak in an environment including an ambient noise. In this case, the sub-peak may cause false detection (case in which presence or absence of existence of an object is misjudged, or inaccurate detection result on the distance to the object or the moving speed of the object is outputted).

The sub-peak is confirmed by an ambiguity function. The ambiguity function is described in "YOKOTA Yasunari, Lecture document, Signal processing, Section 3, Non-stationary signal processing/cepstrum analysis (http://www1.gifu-u.ac.jp/~yktlab/sp3.pdf)". It is defined by the following equation (1), $$A(\tau, v) = \int_{-\infty}^{\infty} U\left(t + \frac{\tau}{2}\right) U*\left(t - \frac{\tau}{2}\right) e^{-2\pi i t v} dt \qquad (1)$$

In the equation (1), "A (τ,ν)" represents the ambiguity function. "τ" represents time difference. "ν" represents frequency shift quantity (Doppler Effect). "U (t)" represents a waveform at a time point t. "*" represents complex conjugate. "e" represents a base of logarithm. "i" represents an imaginary unit. "π" represents the circular constant.

Figure 6:
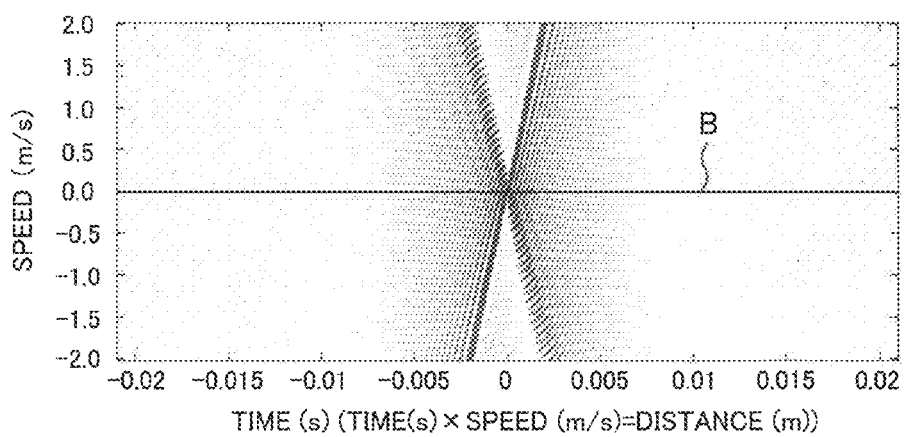
FIG. 6 shows a diagram illustrating a part in which a value of a correlation function is large, based on a spectrogram representing an ambiguity function of SFM.

FIG. 6 is a diagram illustrating a part in which a value of the correlation function is large, based on a spectrogram representing the ambiguity function of SFM. The vertical axis in the graph of FIG. 6 represents frequency shift (corresponding to moving speed), and the horizontal axis therein represents time difference (corresponding to distance). The horizontal line B represents a position corresponding to a value of the correlation function between the transmitting signal and the receiving signal in a case that moving speed of an object is zero.

In FIG. 6, as a color becomes dense (as a color approaches black from gray), a value of the correlation function becomes large. It is ideally preferable that a part where a value of the correlation function is high is located at only the central part (a part where speed is zero and time is zero) and values of the other correlation functions are low. SFM includes plural peaks (parts where a value of the correlation function is high) on the line B in addition to the central part. These peaks are sub-peaks. The sub-peak may be wrongly detected instead of the main peak (the central part in the figure). In the case that the moving speed of the object is detected, the moving speed of the object may be wrongly detected due to the sub-peaks.

The following program is a program which generates SFM in which frequency time change is three times faster than that of SFM generated by the program 1.
=a program generating SFM (program 2)=

```
for ti = 1:1:len;
    sig(ti) = sin(phi);
    tilen = ti/len;
    f1 = fc + beta * sin(3 * 2 * pi * ti/(len));
    phi = phi + (2 * pi * f1/fs);
end
==================
```

Figure 7:
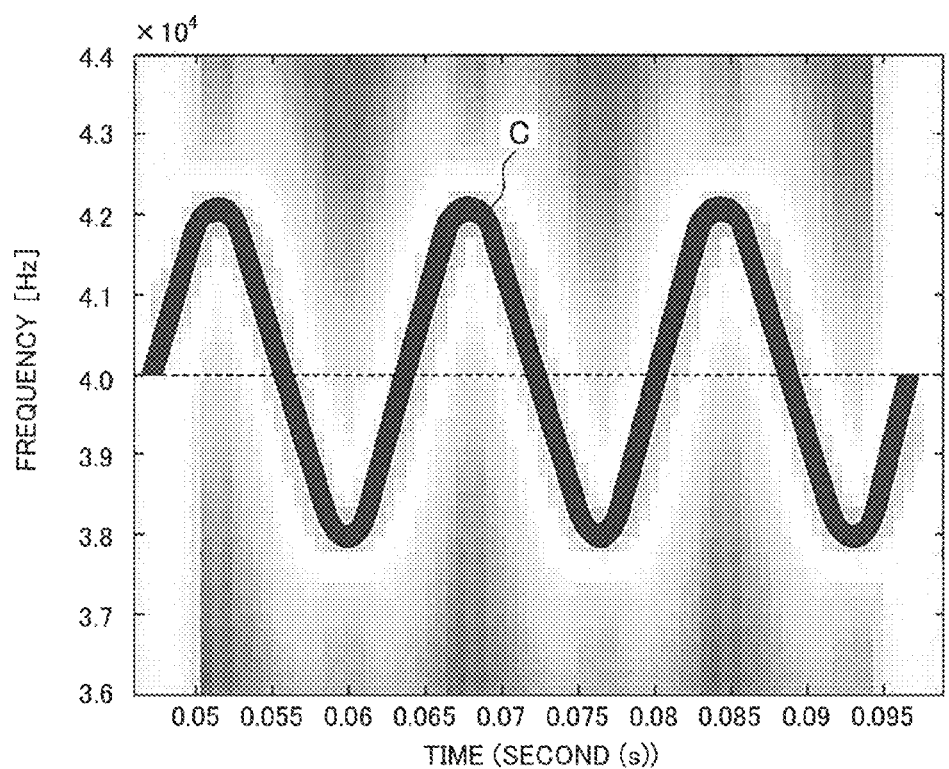
FIG. 7 shows a diagram illustrating a frequency of SFM in which speed of frequency change is tripled compared with SFM illustrated in FIG. 5.

FIG. 7 is a diagram illustrating, based on a spectrogram of the SFM generated with the program 2, how the frequency of SFM changes with respect to time by using the solid line C.

Figure 8:
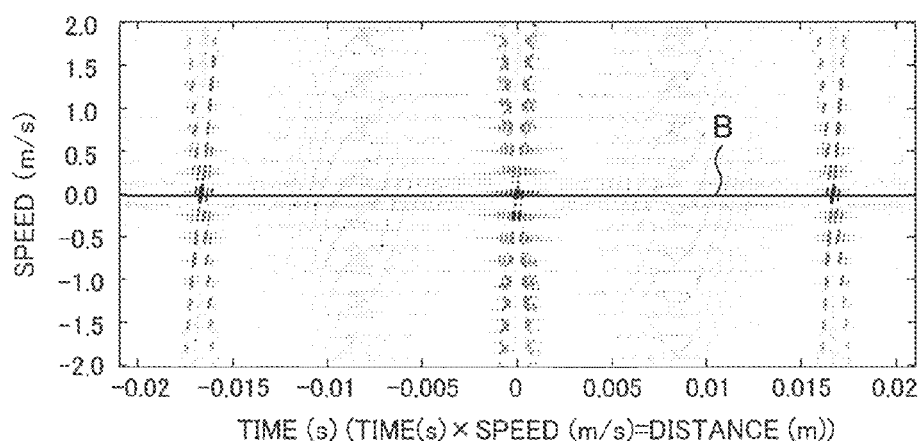
FIG. 8 shows a diagram illustrating a part in which a value of a correlation function is large, based on a spectrogram representing an ambiguity function of SFM having the frequency change illustrated in FIG. 7.

FIG. 8 is a diagram illustrating a part in which a value of a correlation function between the SFM (transmitting signal) and the reflection signal (receiving signal) is large, based on a spectrogram representing the ambiguity function on the SFM generated in the program 2. According to FIG. 8, it is understood that, in a case that SFM in which frequency time change is three times faster than that of SFM generated by the program 1 is used as the transmitting signal, sub-peaks exist at two parts in addition the main peak in the correlation function between the transmitting signal and the receiving signal (reflection signal). The sub-peaks are peaks which occur since the transmitting signal partially includes the same waveforms. If the sub-peaks are detected as the main peak, aforementioned false detection may occur.

In the second exemplary embodiment, the transmitting signal is the modulation wave whose frequency changes non-repetitively. The transmitting signal therefore can suppress the sub-peak in the correlation function with the receiving signal (reflection signal), and thereby can avoid the aforementioned false detection problem.

Specific examples on the transmitting signal in the second exemplary embodiment are described below.

In order to prevent the problem, it is preferable that the frequency of the transmitting signal changes smoothly and non-repetitively. Non-repetitive frequency change of the transmitting signal is, for example, to gradually increase speed of frequency change, to gradually decrease speed of frequency change, to decrease speed of frequency change after gradually increasing that, to increase speed of frequency change after gradually decreasing that, or the like.

A following program is a program, as an example 1 of the transmitting signal, generating a transmitting signal in which speed of frequency change thereof gradually increases.
=a program generating the transmitting signal of the specific example 1 (program 3)=

```
for ti = 1:1:len;
    sig(ti) = sin(phi);
    tilen = ti/len;
    f1 = fc + beta * sin(2 * pi * (tilen + 5 * (tilen * tilen)));
    phi = phi + (2 * pi * f1/fs);
end
==========================
```

Figure 9:
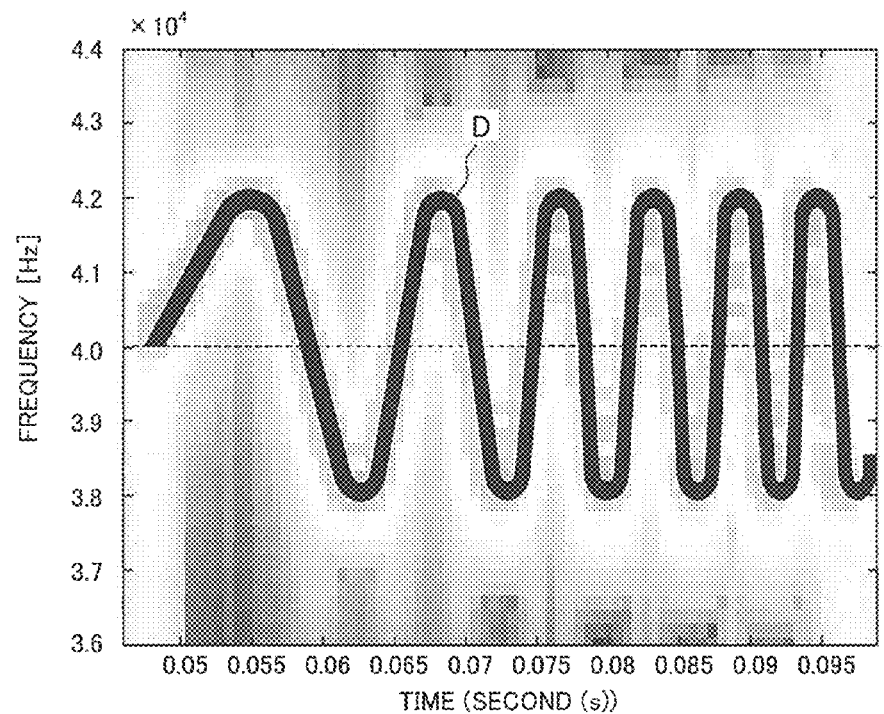
FIG. 9 shows a diagram illustrating an example of how the frequency of SFM changes with respect to time, based on a spectrogram of a transmitting signal of a specific example 1.

FIG. 9 is a diagram illustrating, based on a spectrogram of the transmitting signal generated with the program 3, how the frequency of transmitting signal changes with respect to time by using a solid line D. As shown in FIG. 9, the frequency change in the transmitting signal of the specific example 1 is gradually accelerated. The transmitting signal in the specific example 1 is generated by changing an angular frequency representing frequency modulation f1 of a sine wave in accordance with a quadratic function (tilen+ 5×(Tilen)$^2$) with respect to time tilen.

Figure 10:
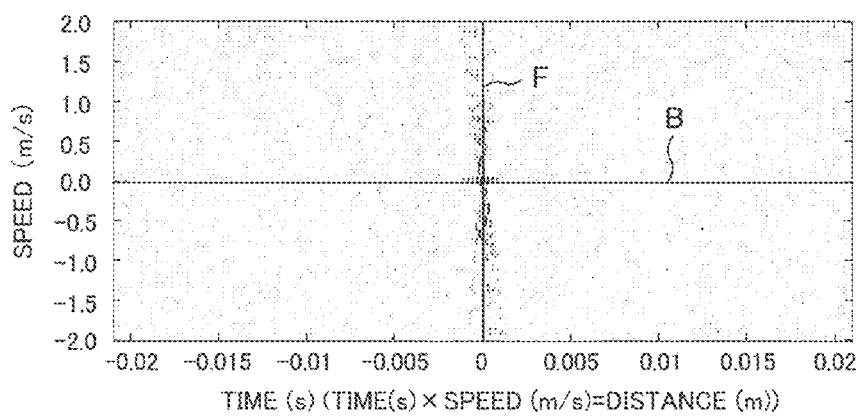
FIG. 10 shows a diagram illustrating a part in which a value of a correlation function is large, based on a spectrogram representing an ambiguity function of the transmitting signal of the specific example 1.

FIG. 10 is a diagram illustrating a part in which a value of a correlation function between the transmitting signal and the reflection signal (receiving signal) is large, based on a spectrogram representing an ambiguity function related to the transmitting signal of the specific example 1. As can be seen from FIG. 10, in the correlation function between the transmitting signal and the reflection signal (receiving signal), though a main peak (central part shown in FIG. 10) is seen, and in a case that speed of an object is zero (refer to horizontal line B), a sub-peak is suppressed. In the vertical line F in which time is zero, parts in which a value of the correlation function is large are few. Thereby it is understood that false detection in object detection can be avoided by the transmitting signal of the specific example 1.

The transmitting signal in the specific example 1 can suppress the sub-peak in the correlation function with the reflection signal (receiving signal) by changing continuously the frequency of the sine wave in one direction (direction in which frequency change is accelerated).

Next, a specific example 2 of a transmitting signal is explained. In the specific example 2, frequency change of the transmitting signal is gradually accelerated after being gradually slowed.

A following program is a program generating the transmitting signal of the specific example 2.
=a program generating the transmitting signal of the specific example 2 (program 4)=

```
for ti = 1:1:len;
    sig(ti) = sin(phi);
    tilen = (ti − 0.5 * len)/len;
    f1 = fc + beta * sin(−2 * pi * (2 * tilen + 5 * (tilen * tilen * tilen)));
    phi = phi + (2 * pi * f1/fs);
end
==========================
```

Figure 11:
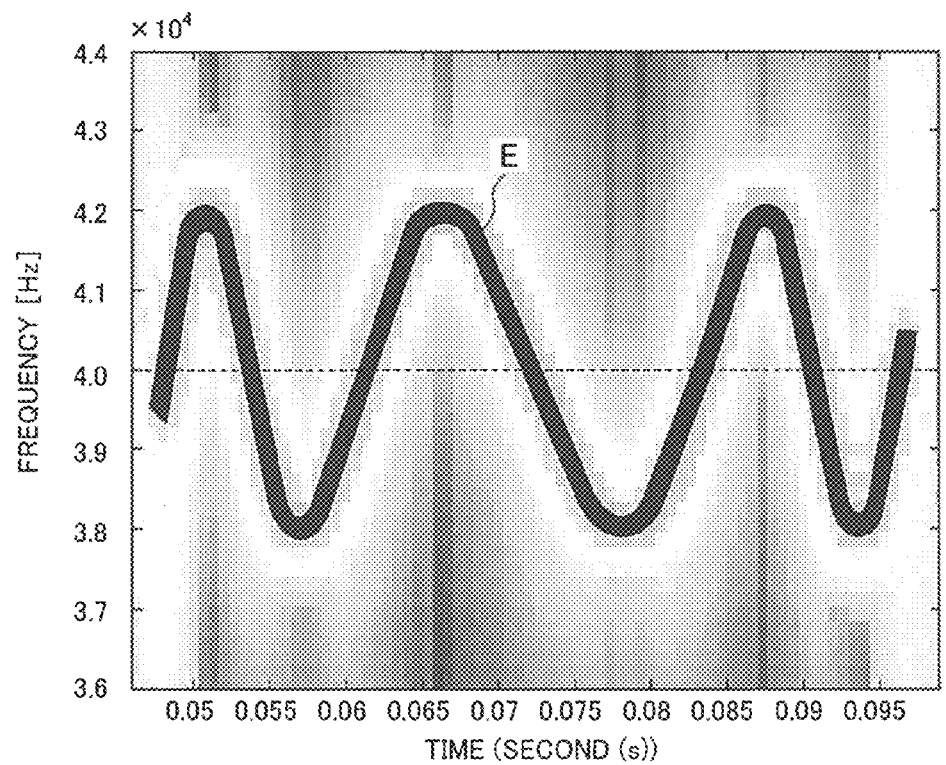
FIG. 11 shows a diagram illustrating an example of how a frequency of SFM changes with respect to time, based on a spectrogram of a transmitting signal of a specific example 2.

FIG. 11 is a diagram illustrating how frequency of the transmitting signal changes with respect to time by using a solid line E, based on a spectrogram of the transmitting signal of the specific example 2 based on the program 4. As shown in FIG. 11, frequency change in the transmitting signal of the specific example 2 is gradually accelerated after being gradually slowed. The transmitting signal in the specific example 2 is generated by changing an angular frequency representing frequency modulation f1 of a sine wave in accordance with a cubic function (2×tilen+ 5×(tilen)$^3$) with respect to time tilen.

Figure 12:
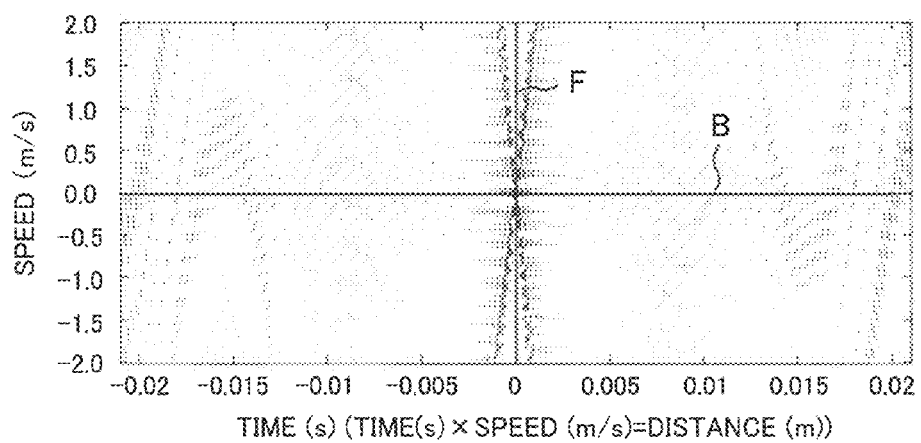
FIG. 12 shows a diagram illustrating a part in which a value of a correlation function is large, based on a spectrogram representing an ambiguity function of the transmitting signal of the specific example 2.

FIG. 12 is a diagram illustrating a part in which a value of the correlation function between the transmitting signal and the reflection signal (receiving signal) is large, based on a spectrogram representing the ambiguity function related to the transmitting signal of the specific example 2. As shown in FIG. 12, in the correlation function between the transmitting signal and the reflection signal (receiving signal) of the specific example 2, a main peak (central part in FIG. 12) is seen, but a sub-peak is suppressed in a case that speed of an object is zero (refer to horizontal line B) and in a case that time is zero (vertical line F). A state shown in FIG. 12 represents that false detection while detecting presence of an object is rare and measurement error which may occur when the distance to an object is measured can be reduced.

In a case that a frequency of a sine wave is continuously changed (frequency change is accelerated after being slowed), the transmitting signal of the specific example 2 can suppress the sub-peak in the correlation function with the reflection signal (receiving signal).

A following program is a program generating a transmitting signal of a specific example 3.

=a program generating the transmitting signal of the specific example 3 (program 5)=

```
for ti = 1:1:len;
   sig(ti) = sin(phi);
   tilen = ti/len;
   f1 = fc + beta * sin(2 * pi * (tilen + 1.0 * (tilen * tilen)));
   phi = phi + (2 * pi * f1/fs);
end
===========================
```

Figure 13:
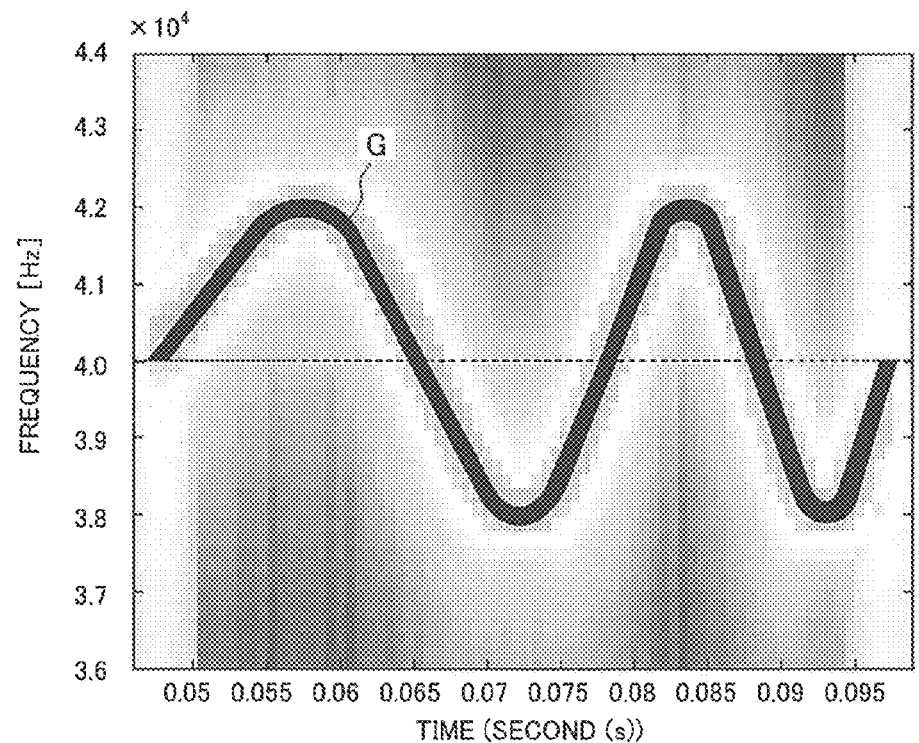
FIG. 13 shows a diagram illustrating an example of how a frequency of SFM changes with respect to time, based on a spectrogram of a transmitting signal of a specific example 3.

FIG. 13 is a diagram illustrating, based on a spectrogram of the transmitting signal of the specific example 3 generated with the program 5, how a frequency of the transmitting signal changes with respect to time by using a solid line G. As shown in FIG. 13, frequency change in the transmitting signal of the specific example 3 is gradually accelerated. The frequency change in the transmitting signal of the specific example 3 is slower than that of the specific example 1, and is non-repetitive just like the specific example 1. The transmitting signal of the specific example 3 is generated by changing an angular frequency representing frequency modulation f1 of a sine wave in accordance with a quadratic function (tilen+(Tilen)$^2$) with respect to time tilen.

Figure 14:
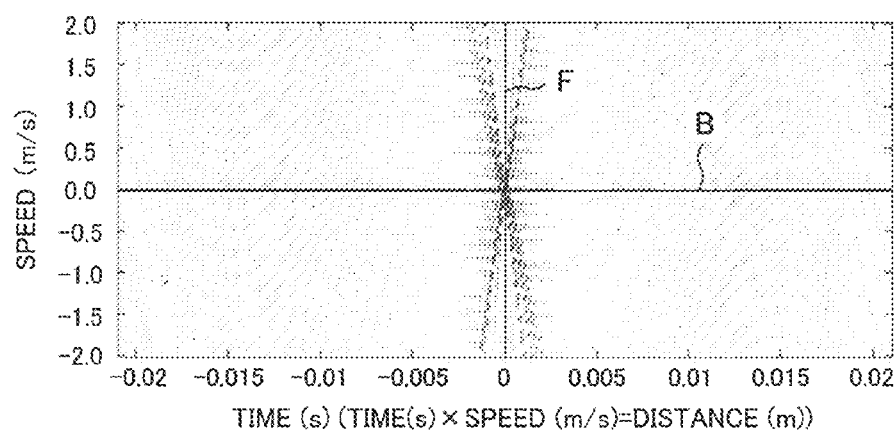
FIG. 14 shows a diagram illustrating a part in which a value of a correlation function is large, based on a spectrogram representing an ambiguity function of the transmitting signal of the specific example 3.

FIG. 14 is a diagram illustrating a part in which a value of the correlation function between the transmitting signal and the reflection signal (receiving signal) is large, based on a spectrogram representing the ambiguity function of the transmitting signal of the specific example 3. As shown in FIG. 14, in the correlation function between the transmitting signal and the reflection signal (receiving signal) of the specific example 3, a main peak (central part shown in FIG. 14) is seen, but a sub-peak is suppressed in a case that speed of an object is zero (refer to horizontal line B) and in a case that time is zero (vertical line F). A state shown in FIG. 14 represents that false detection while detecting presence of an object is rare just like the specific examples 1 and 2 and measurement error which may occur when the distance to an object is measured can be reduced.

The transmitting signal in the specific example 3 can suppress the sub-peak in the correlation function with the reflection signal (receiving signal) by changing continuously a frequency of a sine wave in one direction (direction in which frequency change is accelerated).

A following program is a program generating a transmitting signal of a specific example 4.

=a program generating the transmitting signal of the specific example 4 (program 6)=

```
for ti = 1:1:len;
   sig(ti) = sin(phi);
   tilen = ti/len;
   f1 = fc + beta * sin(2 * pi * (tilen + 2.5 * (tilen * tilen)
                           + 2.0 * (tilen * tilen * tilen));
   phi = phi + (2 * pi * f1/fs);
end
===========================
```

Figure 15:
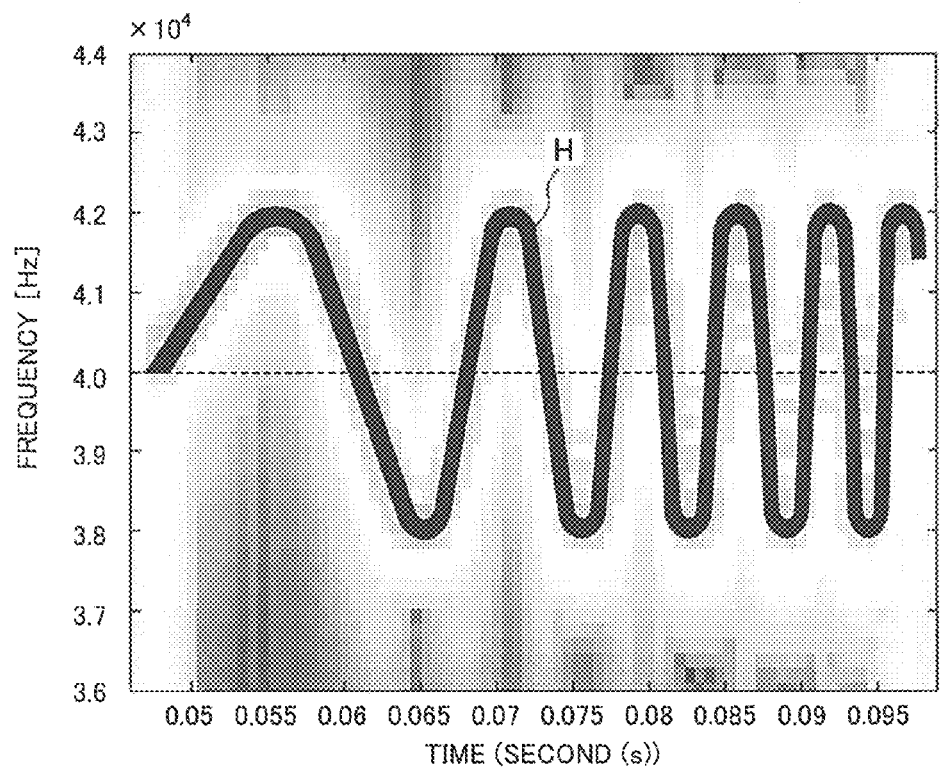
FIG. 15 shows a diagram illustrating an example of how a frequency of SFM changes with respect to time, based on a spectrogram of a transmitting signal of a specific example 4.

FIG. 15 is a diagram illustrating, based on a spectrogram of the transmitting signal of the specific example 3 generated with the program 6, how frequency of the transmitting signal changes with respect to time, by using a solid line H. As shown in FIG. 15, frequency change in the transmitting signal of the specific example 4 is gradually accelerated. The frequency change in the transmitting signal of the specific example 4 is slower than that of the specific example 1, faster than that of the specific example 3, and is non-repetitive just like the specific examples 1 to 3. The transmitting signal of the specific example 4 is generated by changing an angular frequency representing frequency modulation f1 of a sine wave in accordance with a quadratic function (tilen+2.5×(Tilen)$^2$+2×(Tilen)$^3$) with respect to time tilen.

Figure 16:
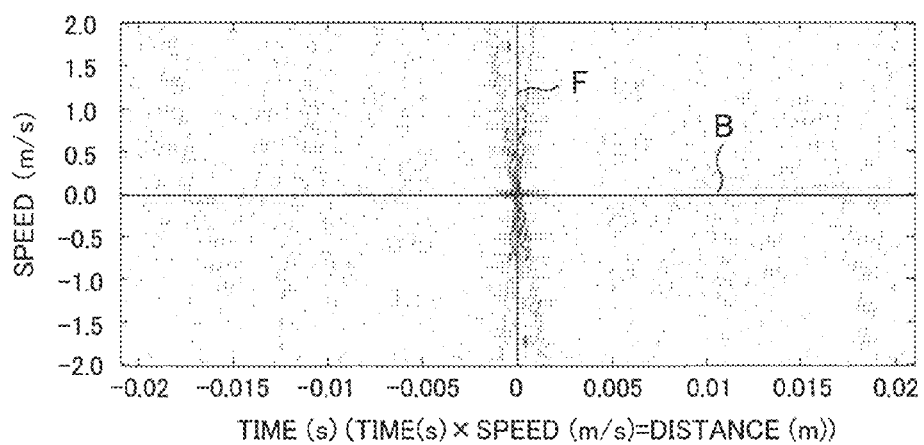
FIG. 16 shows a diagram illustrating a part in which a value of a correlation function is large, based on a spectrogram representing an ambiguity function of the transmitting signal of the specific example 4.

FIG. 16 is a diagram illustrating a part in which a value of the correlation function between the transmitting signal and the reflection signal (receiving signal) is large, based on a spectrogram representing the ambiguity function of the transmitting signal of the specific example 4. As shown in FIG. 16, in the correlation function between the transmitting signal and the reflection signal (receiving signal) of the specific example 4, a main peak (central part shown in FIG. 16) is seen, but a sub-peak is suppressed in a case that speed of an object is zero (refer to horizontal line B) and in a case that time is zero (vertical line F). A state shown in FIG. 16 represents that false detection while detecting presence of an object is rare just like the specific examples 1 to 3 and measurement error which may occur when the distance to an object is measured can be reduced.

The transmitting signal in the specific example 4 can suppress the sub-peak in the correlation function with the reflection signal (receiving signal) by changing continuously frequency of a sine wave in one direction (direction in which frequency change is accelerated).

A following program is a program generating transmitting signal of a specific example 5.

=a program generating the transmitting signal of the specific example 5 (program 7)=

```
for ti = 1:1:len;
   sig(ti) = sin(phi);
   tilen = ti/len;
   f1 = fc + beta * sin(2 * pi * (tilen + 3.0 * (tilen * tilen * tilen)));
   phi = phi + (2 * pi * f1/fs);
end
===========================
```

Figure 17:
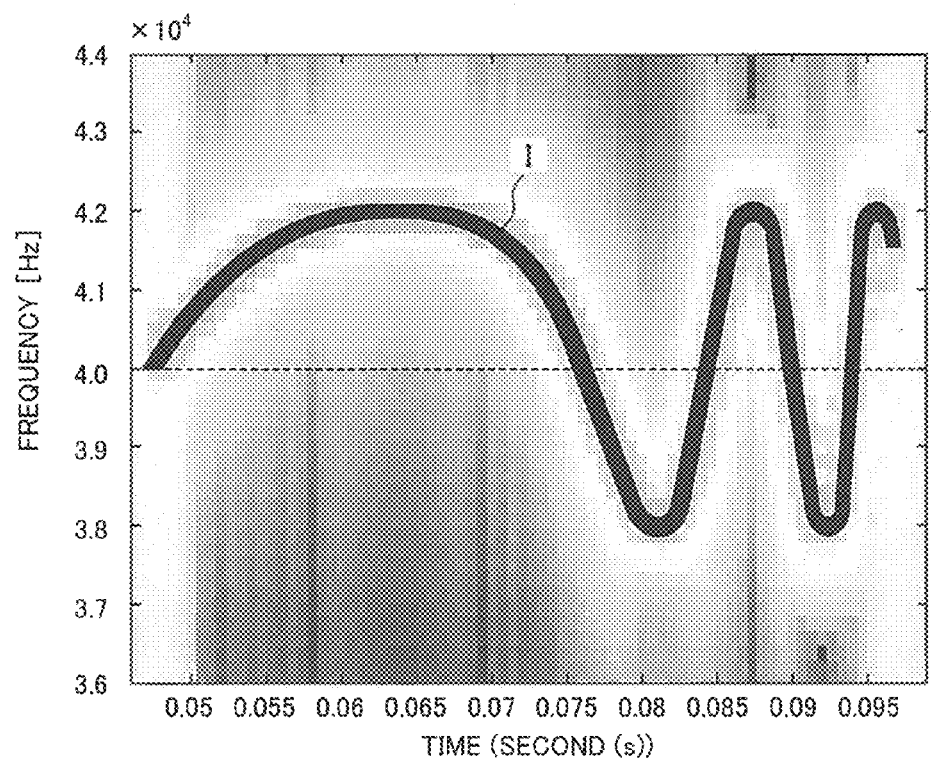
FIG. 17 shows a diagram illustrating an example of how a frequency of SFM changes with respect to time, based on a spectrogram of a transmitting signal of a specific example 5.

FIG. 17 is a diagram illustrating, based on a spectrogram of the transmitting signal of the specific example 5 generated with the program 7, how the frequency of the transmitting signal changes with respect to time by using a solid line I. As shown in FIG. 17, the frequency in the transmitting signal of the specific example 5 changes in a complicated manner within the range having the central frequency 40 kHz and the variation range of ±2 kHz. The transmitting signal of the specific example 5 is signal whose frequency changes non-repetitively.

Figure 18:
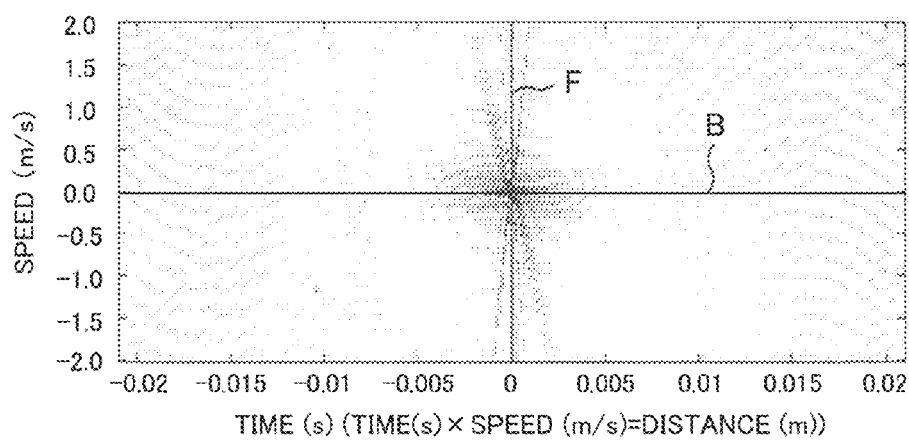
FIG. 18 shows a diagram illustrating a part in which a value of a correlation function is large, based on a spectrogram representing an ambiguity function of the transmitting signal of the specific example 5.

FIG. 18 is a diagram illustrating a part in which a value of the correlation function between the transmitting signal and the reflection signal (receiving signal) is large, based on a spectrogram representing the ambiguity function of the transmitting signal of the specific example 5. As shown in FIG. 18, in the correlation function between the transmitting signal and the reflection signal (receiving signal) of the specific example 5, a main peak (central part shown in FIG. 18) is seen, but a sub-peak is suppressed in a case that speed of an object is zero (refer to horizontal line B) and in a case that time is zero (vertical line F). A state shown in FIG. 18 represents that false detection while detecting presence of an object is rare just like the specific examples 1 to 4, and measurement error which may occur when the distance to an object is measured can be reduced.

Other Exemplary Embodiments

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the specific examples 1 to 5 on the transmitting signal described in the second exemplary embodiment include the specific example in which frequency change of the transmitting signal is accelerated after being gradually slowed, and the specific example in which frequency change of the transmitting signal is gradually accelerated. The apparatus or the method related to the present invention, if a frequency of transmitting signal changes non-repetitively, may generate a transmitting signal whose frequency change is slowed after being gradually accelerated or may generate a transmitting signal whose frequency change is gradually slowed.

Concerning the frequency of the transmitting signal of the specific examples described in the second exemplary embodiment, the angular frequency representing frequency modulation of a sine wave changes in accordance with a function of n-dimension (n is an integer equal to or more than 2) with respect to time. The equation representing the change can be represented using a polynomial equation of time ti, til, and tilen. The frequency change of the transmitting signal generated by the apparatus or the method of the present invention may be change represented by an exponential function, a logarithmic function, a trigonometric function, or the like.

The frequency change of the transmitting signal generated by the apparatus or the method of the present invention may not be smooth change, but may be non-smooth change. In this case, since spectrum may spread and burden on the transmitting element may occur, attention is required. In order to suppress spectrum spread, for example, a band limiting filter is used. Windowing (taper processing, Raised Cosine processing) for suppressing spectrum spread at starting and ending time of a waveform may be used.

The transmitting signal described in the second exemplary embodiment includes the waveform in which SFM is deformed. The transmitting signal generated by the apparatus of the present invention or the method thereof may be signal except the signal having the waveform in which SFM is deformed, if the frequency of the signal changes so that a high peak is not generated at a part other than a central part. In order not to place a burden on the transmitting element, it is preferable that power, waveform amplitude and frequency fall within the range where the transmitting element normally generates a signal.

In the first and the second exemplary embodiments, a technique for detecting an object (technique for detecting presence of an object, distance to an object and moving speed of an object) utilizes the cross correlation function between of a reception waveform and an expected reception waveform. The technique for detecting an object related to the present invention may be a technique using a different index representing a degree of coincidence between the reception waveform and the expected reception waveform. A signal processing apparatus and an object detecting apparatus using such technique can generate the transmitting signal shown in the first and the second exemplary embodiments and can produce the same advantageous effect as the effect described in the first and the second exemplary embodiments.

In the first and the second exemplary embodiment, the transmitting signal transmitted from the object detecting apparatus is a sound wave or an ultrasonic wave. For example, an electromagnetic wave (e.g. radio wave) other than the sound wave and the ultrasonic wave is available.

The technology for detecting an object by using a sound wave or an ultrasonic wave can be applied to a technology in which robots go by each other without hitting (without collision) and a technology for avoiding car collision. The present invention can be applied to a technology for monitoring an intruder in an office, a technology for detecting someone's movement in a gymnasium, a technology for monitoring an obstacle in water, and the like. In monitoring in water at a port, an ultrasonic wave is attenuated soon, and not available in many cases. However, if a sound wave called Active Sonar is used, it becomes possible to detect presence of an object and to measure distance to an object and moving speed of an object.

In the second exemplary embodiment, a plurality of types of the transmitting signals are disclosed. The signal processing apparatus and the object detecting apparatus are not limited to have a function for transmitting one type of the transmitting signal. The apparatuses may have, for example, a configuration having programs generating a plurality of types of transmitting signals.

Further the signal processing apparatus of another exemplary embodiment related to the present invention includes, generating means for generating a modulation wave whose frequency changes non-repetitively in order to transmit it as a transmitting signal, and detecting means for detecting at least one of presence of an object, distance to an object, and moving speed of an object, by calculating and analyzing correlation between a reflection signal generated when the transmitting signal is reflected by the object and the transmitting signal.

An object detecting method of another exemplary embodiment related to the present invention includes, a generating step of generating a modulation wave whose frequency changes non-repetitively, a transmitting step of transmitting the modulation wave as transmitting signal, a receiving step of receiving a reflection signal generated when the transmitting signal is reflected by an object, a detecting step of detecting at least one of presence of the object, distance to the object, and moving speed of the object, by calculating and analyzing correlation between the reflection signal and the transmitting signal.

A program included in the signal processing apparatus, the object detecting apparatus, and an apparatus provided with the object detecting apparatus of another exemplary embodiment related to the present invention includes a generating step of generating a modulation wave whose frequency changes non-repetitively, a transmitting step of transmitting the modulation wave as a transmitting signal, a receiving step of receiving reflection signal generated when the transmitting signal is reflected by an object, a detecting step of detecting at least one of presence of the object, distance to the object, and moving speed of the object, by calculating and analyzing correlation between the reflection signal and the transmitting signal.

This application is based upon and claims the benefit of priority from Japanese patent application No. 2012-041455, filed on Feb. 28, 2012, the disclosure of which is incorporated herein in its entirety by reference.

INDUSTRIAL APPLICABILITY

The present invention can be used in various fields in which the technology for detecting an object is used.

REFERENCE SIGNS LIST 1, 21 signal processing apparatus
2, 30 generating unit
3, 40 detecting unit
5, 20 object detecting apparatus
7, 22 transmitting unit
8, 23 receiving unit
31 sine wave generating unit
32 frequency control unit

What is claimed is:

1. A signal processing apparatus, comprising:
a generating unit that generates a modulation wave as a transmitting signal by setting an angular frequency representing frequency modulation of a sine wave to a first constant plus a product, the product equal to a second constant times a sine function of two times pi times a quadratic function, the quadratic function equal to $\text{tilen}+5\times(\text{tilen})^2$, where tilen represents time; and
a detecting unit that detects at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

2. A signal processing apparatus, comprising:
a generating unit that generates a modulation wave as a transmitting signal by setting an angular frequency representing frequency modulation of a sine wave to a first constant plus a product, the product equal to a second constant times a sine function of two times pi times a quadratic function, the quadratic function equal to $\text{tilen}+2.5\times(\text{tilen})^2+2\times(\text{tilen})^3$, where tilen represents time; and
a detecting unit that detects at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

3. A signal processing apparatus, comprising:
a generating unit that generates a modulation wave as a transmitting signal by setting an angular frequency representing frequency modulation of a sine wave to a first constant plus a product, the product equal to a second constant times a sine function of two times pi times a quadratic function, the quadratic function equal to $2\times(\text{tilen})+5\times(\text{tilen})^3$, where tilen represents time; and
a detecting unit that detects at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

4. An object detecting apparatus, comprising:
a signal processing apparatus according to claim 1;
a transmitting unit which transmits a transmitting signal generated by a generating unit of the signal processing apparatus; and
a receiving unit which receives a reflection signal generated when the transmitting signal is reflected by an object.

5. A method comprising:
generating a modulation wave as a transmitting signal by setting an angular frequency representing frequency modulation of a sine wave to a first constant plus a product, the product equal to a second constant times a sine function of two times pi times a quadratic function, the quadratic function equal to $\text{tilen}+5\times(\text{tilen})^2$, where tilen represents time; and
detecting at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

6. A method comprising:
generating a modulation wave as a transmitting signal by setting an angular frequency representing frequency modulation of a sine wave to a first constant plus a product, the product equal to a second constant times a sine function of two times pi times a quadratic function, the quadratic function equal to $\text{tilen}+2.5\times(\text{tilen})^2+2\times(\text{tilen})^3$, where tilen represents time; and
detecting at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

7. A method comprising:
generating a modulation wave as a transmitting signal by setting an angular frequency representing frequency modulation of a sine wave to a first constant plus a product, the product equal to a second constant times a sine function of two times pi times a quadratic function, the quadratic function equal to $2\times(\text{tilen})+5\times(\text{tilen})^3$, where tilen represents time; and
detecting at least one of presence of an object, distance to the object, and moving speed of the object, based on a correlation between a receiving signal and the transmitting signal, the receiving signal being received by a receiving unit that can receive a reflection signal generated when the transmitting signal is reflected by the object.

* * * * *